D. J. NOBLE.

Wheel-Cultivator.

No. 2,683 Reissued July 16. 1867.

Witnesses:

Wm Freurn

W Dean Overell

Inventor:

D J Noble

By Munn & Co

Attys.

AM. PHOTO-LITHO. CO. N.Y. (OSBORNE'S PROCESS)

United States Patent Office.

D. J. NOBLE, OF NEW BOSTON, ILLINOIS.

*Letters Patent No.* 53,326, *dated March* 20, 1866; *reissue No.* 2,683, *dated July* 16, 1867.

IMPROVEMENT IN CULTIVATORS.

The Schedule referred to in these Letters Patent and making part of the same.

TO ALL WHOM IT MAY CONCERN:

Be it known that I, D. J. NOBLE, of New Boston, in the county of Mercer, and State of Illinois, have invented a new and useful Improvement in Cultivators; and I do hereby declare that the following is a full, clear, and exact description of the same, reference being had to the accompanying drawings, and letters and figures marked thereon, which form a part of this specification, and in which—

Figure 1:
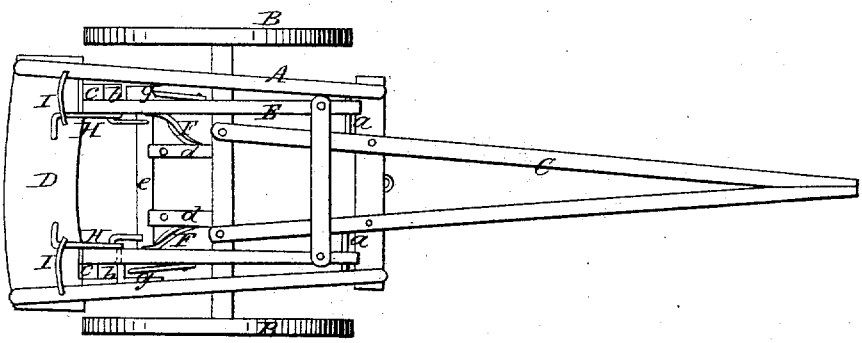

Figure 1 represents a plan view of my invention.

Figure 2:
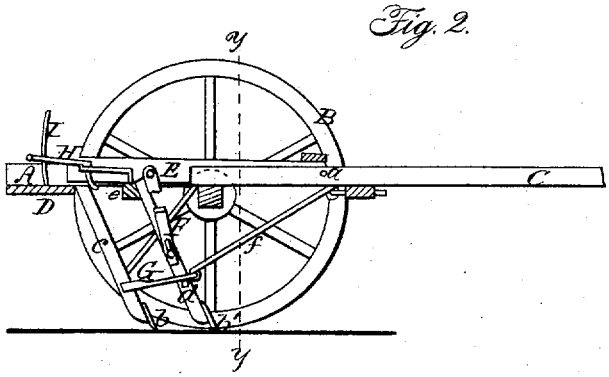
Figure 3:
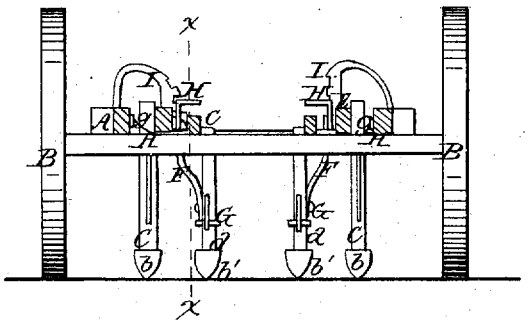

Figure 2, a side sectional view at *x* in fig. 3; and

Figure 3 a transverse sectional view at *y* in fig. 2.

The same letters of reference represent the corresponding parts in the different figures.

The nature of my invention consists in a novel arrangement whereby the plough-frame is adjusted and locked in any position whereby the ploughs are caused to run at any required depth, and forced to run uniformly at that depth; it also consists in a novel device which will lock the plough-frame at any required elevation; at the same time when not locked serve to raise and hold the frame elevated in such a position as to clear the ploughs from the ground.

To enable those skilled in the art to manufacture and use my invention, I will proceed to describe the same with particularity.

A represents the main frame of the cultivator, which is mounted on wheels B B, and C is the draught-pole, which has the seat D at its rear end. E represents the plough-frame, the front end of which works on rods *a* in the front end of the main frame A. The rear and outer ploughs *b* are secured to inclined standards *c*, which are attached to the back part of the frame E, while the front and inner ploughs *b'* have their standards *d* pivoted to the cross-bar *e*, which extends across the plough-frame E. Said pivoted standards are held in position by springs F, which springs admit of the ploughs *b'* being moved laterally under the action of treadles G to conform to the sinuosities of the rows of plants, said treadles being attached to the standards *d* and extending back within convenient reach of the feet of the driver on the seat D. The standards *d* are braced by the rods *f* from the front cross-bar of the main frame A. The springs F have a tendency to keep the standards *d* in position and thereby ease the labor of the driver, as he is only required to move the standards to follow the sinuosities, and in no way to give them attention to keep them from moving laterally at the wrong time. H H represent two crank-shaped arms, the front ends of which are secured by pivots *g* to the inner surface of the sides of the main frame A. They extend under the side pieces of the plough-frame E, and project back so as to be conveniently reached by the operator on the seat D. There are notched plates I attached to the seat or the main frame of the plough near the seat, the arms or levers H being arranged relative to said notched plates in such a manner that when the levers are brought down they will spring into the notches on the said plates I. There are rods J attached to the insides of the plough-frame E in such a manner that the levers H press down upon them and prevent the frame E from being raised. When the levers H are clasped in notches in the plates I by passing under the side pieces of the plough-frame E, they prevent the frame from settling any lower, and by passing over the wires J they prevent it from rising, that is, they lock said plough-frame and hold it at just that elevation, and thereby the ploughs are caused to run at a certain and uniform depth in the soil. When it is desired to have them run at any other depth the levers are raised or lowered in the notches in the plates I; also if the leaves H are removed from the notches in the plates I and thrown up perpendicular by being turned on the pivots *g*, they throw up the plough-frame E, the side pieces of which rest on the shoulders on the said levers and hold it elevated without any attention from the operator, so that the ploughs clear the ground, when the cultivator can be readily driven from place to place or turned at the end of the rows.

It is obvious that the adjustable plough-beams E may be locked or secured to the stationary frame at the desired height by many other devices than the particular means herein specified, and I do not therefore desire to be limited to my invention when said specific device is employed; but having thus fully described the construction and operation of my invention, what I claim, and desire to secure by Letters Patent, is—

1. I claim the combination of the adjustable plough-beams E with a stationary frame, A, and a device whereby said beams may be locked rigidly at any desired height, substantially as and for the purposes specified.

2. I claim the levers H H, pivoted to the frame A and arranged relatively with the plough-frame E, as herein specified, in combination with the notched-plates I I, when all are constructed and operated substantially as and for the purposes set forth.

D. J. NOBLE.

Witnesses:

ISAAC THOMPSON,

G. W. WARNER.